United States Patent
Shimizu et al.

(10) Patent No.: US 6,349,351 B1
(45) Date of Patent: Feb. 19, 2002

(54) APPARATUS AND METHOD FOR DATA TRANSFER INCLUDING TABLE THAT STORES RELATIVE POSITION OF DEVICES AND DATA TRANSFER EFFICIENCIES OF RESPECTIVE TRANSFER PATHS

(75) Inventors: Hidehiro Shimizu; Mitsunori Kori, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/219,801

(22) Filed: Dec. 23, 1998

(30) Foreign Application Priority Data

Jun. 3, 1998 (JP) .......................................... 10-154053

(51) Int. Cl.[7] ............................................. G06F 13/36
(52) U.S. Cl. ............................. 710/38; 710/31; 710/34; 710/120; 710/131; 709/242; 370/404; 716/1
(58) Field of Search .............................. 710/31, 34, 38, 710/120, 131; 709/242; 370/404; 716/1

(56) References Cited

U.S. PATENT DOCUMENTS

| | | | | |
|---|---|---|---|---|
| 5,495,479 A | * | 2/1996 | Galaand et al. | 370/404 |
| 5,768,531 A | * | 6/1998 | Lin | 709/242 |
| 5,835,942 A | | 11/1998 | Putzolu | 709/310 |
| 6,092,170 A | | 7/2000 | Kori | 711/202 |
| 6,098,111 A | | 8/2000 | Maegawa et al. | 711/113 |
| 6,223,236 B1 | | 4/2001 | Kori | 710/120 |
| 6,247,161 B1 | * | 6/2001 | Lambrecht et al. | 716/1 |

FOREIGN PATENT DOCUMENTS

SE 2231380 4/1997

OTHER PUBLICATIONS

Fryer, Ron; "Teradata Version 2: Critical Success Factors for Data Warehouses", NCR Mar. 11, 1996, pp. 1–21.
"ServerNet Interconnect Technology", Tandem 1995, pp. 1–7.
"Peer–to–Peer Proposal—Revision 0.14 version 7" 120 SIG, Oct. 20, 1997, pp. 122–133.

* cited by examiner

Primary Examiner—Thomas Lee
Assistant Examiner—Tammara Peyton
(74) Attorney, Agent, or Firm—Leydig, Voit & Mayer, Ltd.

(57) ABSTRACT

The invention prevents data transfer in a computer network from being sent via a path incapable of transfer or of poor data transfer efficiency. A central processing unit, a main memory unit, and storage devices for storing data and data processing devices are connected in the network, and the data is transferred mutually between the storage devices and the data processing devices without passing through the central processing unit or the main memory unit. The apparatus includes a data transfer control module that identifies the capability/incapability of data transfer based on the physical positions of the storage devices, the physical positions of the data processing devices, and the transfer paths incapable of data transfer. The volume management module specifies a combination of storage devices capable of data transfer based on the physical positions of the storage devices, the physical positions of data processing devices, and the transfer paths capable of data transfer.

16 Claims, 13 Drawing Sheets

APPARATUS AND METHOD FOR DATA TRANSFER INCLUDING TABLE THAT STORES RELATIVE POSITION OF DEVICES AND DATA TRANSFER EFFICIENCIES OF RESPECTIVE TRANSFER PATHS

BACKGROUND OF THE INVENTION

This invention relates to a volume management module for data transfer between a plurality of devices connected to buses.

FIELD OF THE INVENTION

There are times when peer-to-peer data transfer (direct data transfer between a plurality of devices without using a main memory unit) is implemented to reduce load on the Central Processing Unit (CPU) and buses during data transfer. For peer-to-peer data transfer, however, data transfer could be disabled or efficiency of data transfer may be degraded on account of physical positions of the devices or the type of available buses. Some buses are fixed to a certain transfer source or destination device, disabling peer-to-peer transfer between arbitrary devices. Such buses are called a peer-to-peer transfer incapable bus.

Referring to FIG. 13, if a bus 1 is assumed to be a-peer-to-peer incapable bus, and buses 2a and 2b are peer-to-peer transfer capable buses, then data transfer between physical devices 60a and 61a and a device (Input/Output (I/O) processor) 5b, or between physical disks 60b and 61b and a device (I/O processor) 5a is disabled because of the peer-to-peer data transfer incapable path. If data is sent through such a transfer incapable path, a fatal failure may occur.

In a conventional peer-to-peer data transfer, the data transfer capability is decided only with a unit of devices physical disks). However, there is a volume management system that can configure a logical volume with a plurality of partitions in different physical disks. The term partition could cover all of the disks or part of them. The term logical volume refers to a single logical memory made up of two or more partitions combined. The term logical volume includes the all levels (0 through 5) of Redundant Arrays of Inexpensive Disk (RAID) and a spanned volume. Such a volume management system is not compatible with peer-to-peer data transfer because it is impossible to select a destination device (I/O processor, etc.) appropriate to a physical disk containing data. When a logical volume 7 is configured as shown in FIG. 13, the peer-to-peer transfer incapable path which disables data transfer to devices (I/O processor) 5a and 5b is included, whereby peer-to-peer data transfer between the logical volume and the I/O processor is disabled.

Suppose bus 1 is peer-to-peer transfer capable, and the paths from bus 2a and bus 2b to bus 1 are inefficient peer-to-peer transfer paths, and the transfer paths that take only bus 2a and only bus 2b are efficient peer-to-peer transfer paths. Then, if the logical volume 7 is configured, because there are paths by which transfer efficiency is low for both the devices (I/O processor) 5a and 5b, the advantage in peer-to-peer data transfer performance between the logical volume and the I/O processor would be lost.

PROBLEMS TO BE SOLVED BY THE INVENTION

With the conventional peer-to-peer data transfer, safe and highly efficient data transfer was impossible when a logical volume configured with a plurality of partitions in different physical disks is set as the source or destination of data transfer.

This invention aims to solve the above-mentioned problem. This invention aims at offering a data transfer apparatus between devices that controls peer-to-peer data transfer between the logical volume and destination device or between the logical volume and source device for the data transfer apparatus between devices having a volume management system that can configure the logical volume to include a plurality of partitions.

Moreover, this invention aims at offering a data transfer for data transfer between devices which does not send data to a path incapable of transfer or capable of only low transfer efficiency.

SUMMARY OF THE INVENTION

A data transfer apparatus for data transfer between devices, wherein a plurality of storage devices and a plurality of data processing devices are connected via a plurality of transfer paths, and a data is transferred between the storage devices and the data processing devices via at least one of the plurality of transfer paths may comprise a table for memorizing physical positions of the storage devices, physical positions of the plurality of data processing devices, and the data transfer efficiency of the plurality of transfer paths, and a data transfer control module for identifying whether data transfer is capable or not between the storage devices and the data processing devices based on the physical positions of the plurality of storage devices, the physical positions of the plurality of data processing devices, and the data transfer efficiency of the plurality of transfer paths memorized on the table.

The data transfer apparatus between devices, wherein the data transfer control module may issue warning against a selection of the transfer path with poor transfer efficiency.

The data transfer apparatus between devices may further comprise a main memory unit, and wherein the data transfer control module may transfer the data to the main memory unit without transferring the data between the devices if the transfer path with poor transfer efficiency is selected.

The data transfer apparatus between devices, wherein the table may memorize a capability/incapability of data transfer as the data transfer efficiency, and wherein the data transfer control module may classify the capability/incapability of data transfer based on the capability/incapability of data transfer.

The data transfer apparatus between devices may further comprise a volume management module which specifies a combination of storage devices to/from which the data can be transferred, based on the physical positions of the plurality of storage devices, the physical positions of the plurality of data processing devices, and the data transfer efficiency of the plurality of transfer paths.

The data transfer apparatus between devices, wherein the volume management module may automatically create a logical volume from the combination of the storage devices to/from which the data can be transferred.

The data transfer apparatus between devices, wherein the volume management module may prohibit a creation of the logical volume which includes a storage device not included in the combination of the storage devices to/from which the data can be transferred.

The data transfer apparatus between devices, wherein the data transfer control module may select the data processing device using the transfer path with high transfer efficiency, based on the physical positions of the plurality of storage devices and the physical positions of the plurality of data processing devices constituting the logical volume having redundancy, and the transfer efficiency of the plurality of transfer paths.

The data transfer apparatus between devices, wherein the data transfer control module may identify the capability/incapability of data transfer in a unit of files.

The data transfer apparatus between devices, wherein the data transfer control module may identify the capability/incapability of data transfer in the unit of data blocks.

The data transfer apparatus between devices, wherein the data transfer control module may select the data transfer device in the unit of files.

The data transfer apparatus between devices, wherein the data transfer control module may select the data transfer device in the unit of data blocks.

A data transfer apparatus between devices, wherein a plurality of storage devices and a plurality of data processing devices may be connected via a plurality of transfer paths, and a data may be transferred between the storage devices and the data processing devices via at least one of the plurality of the transfer paths may comprise a table for memorizing physical positions of the storage devices, physical positions of the plurality of data processing devices, data transfer efficiency of the plurality of transfer paths, and; a volume management module for identifying a combination of storage devices capable of data transfer, based on the physical positions of the plurality of storage devices, the physical positions of the plurality of data processing devices, and the data transfer efficiency of the plurality of transfer paths.

The data transfer apparatus between devices, wherein the volume management module may automatically create a logical volume from the combination of the storage devices to/from which the data can be transferred.

The data transfer apparatus between devices, wherein the volume management module may prohibit a creation of the logical volume including a storage device not included in the combination of the storage devices to/from which the data can be transferred.

The data transfer apparatus between devices, wherein the table may memorize the data transfer capability/incapability as the data transfer efficiency, and wherein the volume management module may identify the combination of the storage devices based on the capability/incapability of data transfer.

A data transfer method between devices, wherein a plurality of storage devices and a plurality of data processing devices may be connected via a plurality of transfer paths, and a data may be transferred between the storage devices and the data processing devices via at least one of the plurality of transfer paths may comprise the steps of memorizing physical positions of the storage devices, physical positions of the plurality of data processing devices, and data transfer efficiency of the plurality of transfer paths, and controlling data transfer for identifying the capability/incapability of data transfer between the storage devices and the data processing devices, based on the physical positions of the plurality of storage devices, the physical positions of the plurality of data processing devices and the data transfer efficiency of the plurality of transfer paths memorized on the table.

The data transfer method between devices may further comprise a step of managing a volume for identifying a combination of storage devices capable of data transfer, based on the physical positions of the plurality of storage devices, the physical positions of the plurality of data processing devices, and the data transfer efficiency of the plurality of transfer paths memorized on the table.

BRIEF DESCRIPTION OF THE DRAWINGS

Other objects features, and advantages of the invention will be apparent from the following description when taken in conjunction with the accompanying drawings.

In the drawings.

DESCRIPTION OF THE PREFERRED EMBODIMENTS

Embodiment 1.

Figure 1:
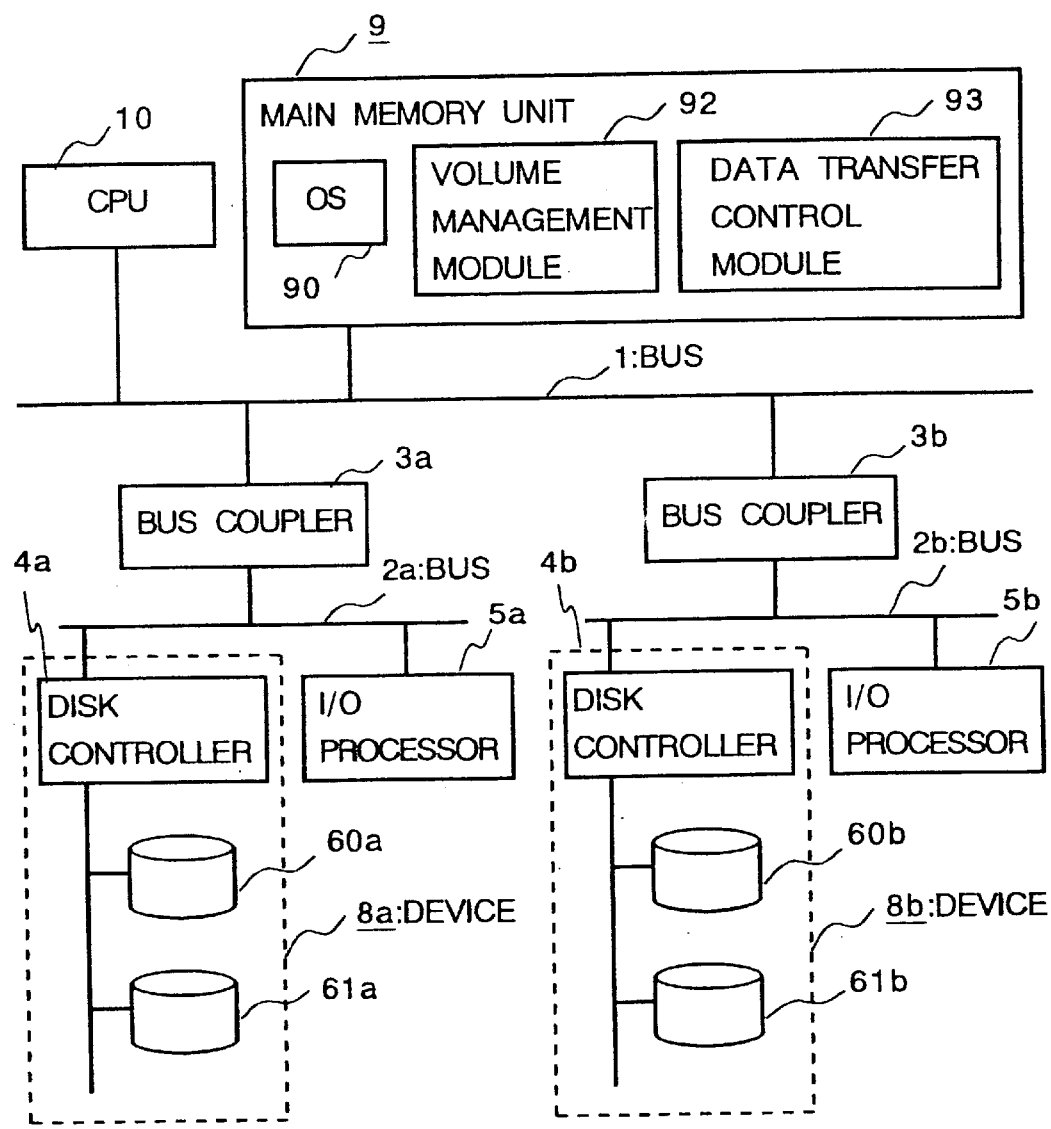
FIG. 1 shows a configuration of Embodiment 1 of the present invention.

FIG. 1 shows an example of system configuration of a data transfer apparatus between devices of this embodiment.

A central processing unit (CPU) 10 controls each unit of the entire system. A main memory unit 9 stores an operating system 90 which controls the entire system software. A bus 1 is a primary bus and links CPU 10, main memory unit 9 and each device, and linked to a bus 2a and a bus 2b (secondary bus) by bus couplers 3a and 3b, which connect a plurality of buses. The bus coupler 3a or 3b is, for example, bridges. Magnetic disks 60a and 61a are connected to bus 2a by a disk controller (adapter) 4a, constituting one storage device 8a. Similarly, magnetic disks 60b, 61b are connected to bus 2b via a disk controller 4b constituting one storage device 8b. Magnetic disks 60a, 61a, 60b, and 61b are also called physical disks, hereinafter. Devices 5a and 5b are data processing devices connected to bus 2a and bus 2b, respectively. The device 5a or 5b is, for example, an I/O processor incorporating an internal memory.

Normally, two or more devices 8a and 8b, and devices 5a and 5b are connected to one system, and for this embodiment of the data transfer apparatus between devices, direct data transfer is carried out mutually between devices 8a and 8b and devices 5a and 5b. Data stored in devices 8a and 8b is usually transferred to main memory unit 9 and processed by CPU 10. However, in this embodiment, data stored in devices 8a and 8b is transferred to memory in devices 5a and 5b without once going through the main memory unit, and processed by the I/O processors incorporated in devices 5a and 5b.

For Embodiment 1, the volume management module and data transfer control module are realized by software stored in main memory unit 9. The volume management module 92 and data transfer control module 93 are installed as software separated from operating system 90, and are able to ask operating system 90 for system information.

It is also possible to realize volume management module 92 and data transfer control module 93 as firmware, or hardware. It is also possible to realize as a combination of software, firmware, and hardware.

Figure 2:
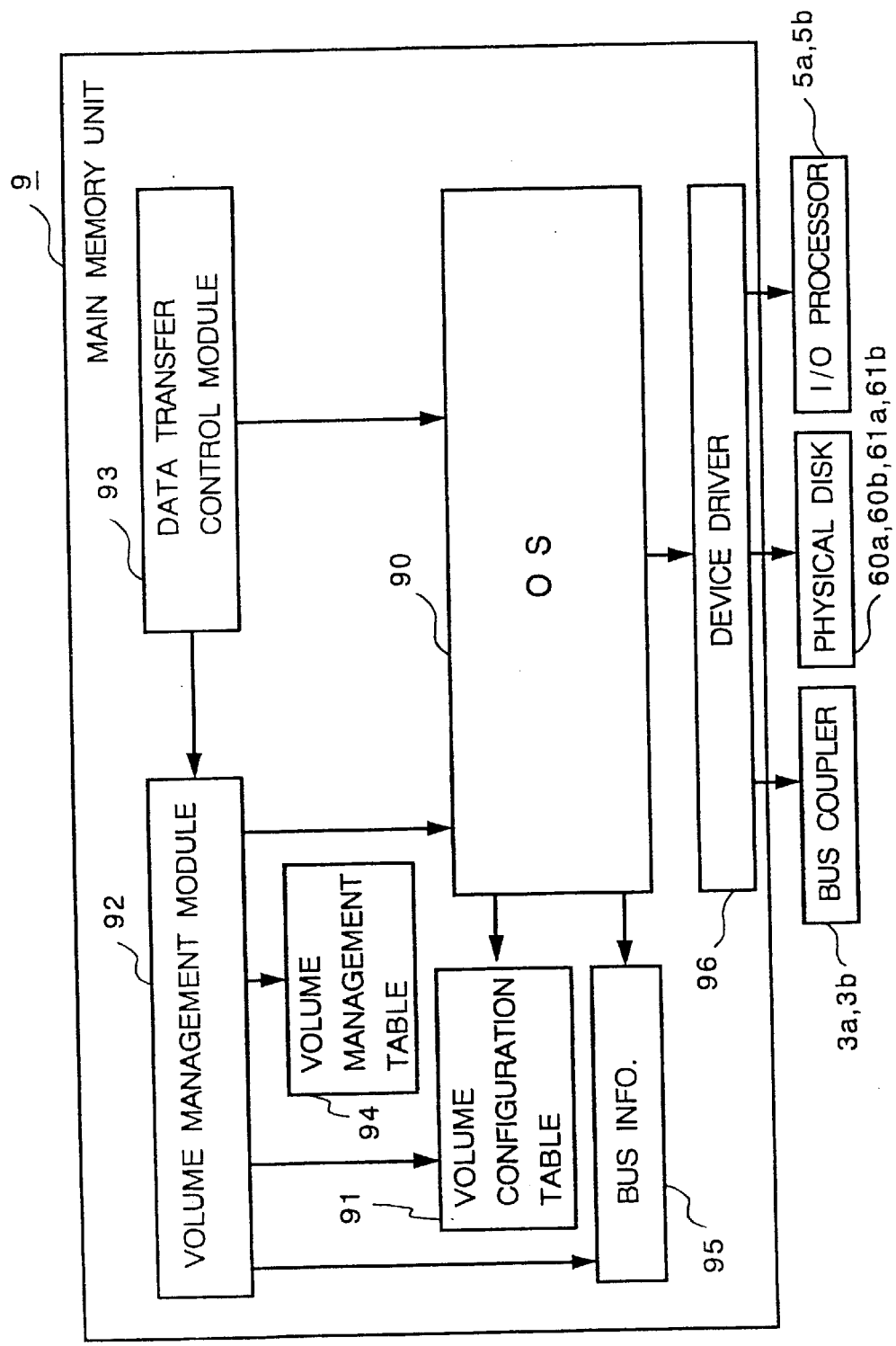
FIG. 2 shows software configuration of Embodiment 1 of the present invention.

FIG. 2 shows a configuration indicating the relationship among the operating system, volume management module and data transfer control module.

Arrows in FIG. 2 indicate the direction in which inquiries, references, processing requests, and creations are made and received. The operating system 90 issues a request for information collection to a device driver 96 at initialization or when a user uses a tool, and creates a volume configuration table 91 and bus information 95. The volume configuration table 91 stores the volume configuration information managed by operating system 90. The volume management module 92, after initialization of the operating system, directly refers to the volume configuration table 91, or issues a request to collect information concerning the volume configuration information, bus information, physical disk partition information, bus connection information, or I/O processor information, etc. to operating system 90, in order to create volume management table 94. The contents of information in volume management table 94 are described in detail with respect to FIG. 3.

The data transfer control module 93 issues a request of information collection to volume management module 92 before data transfer, so as to obtain the transfer capability or efficiency of the transfer paths. At this time, the volume management module 92 refers to volume management table 94. Based on the information of the transfer paths, the data transfer control module 93 issues an request for data transfer to operating system 90. The operating system 90 passes the request for data transfer to device driver 96, in accordance with the request from the data transfer control module.

Figure 3:
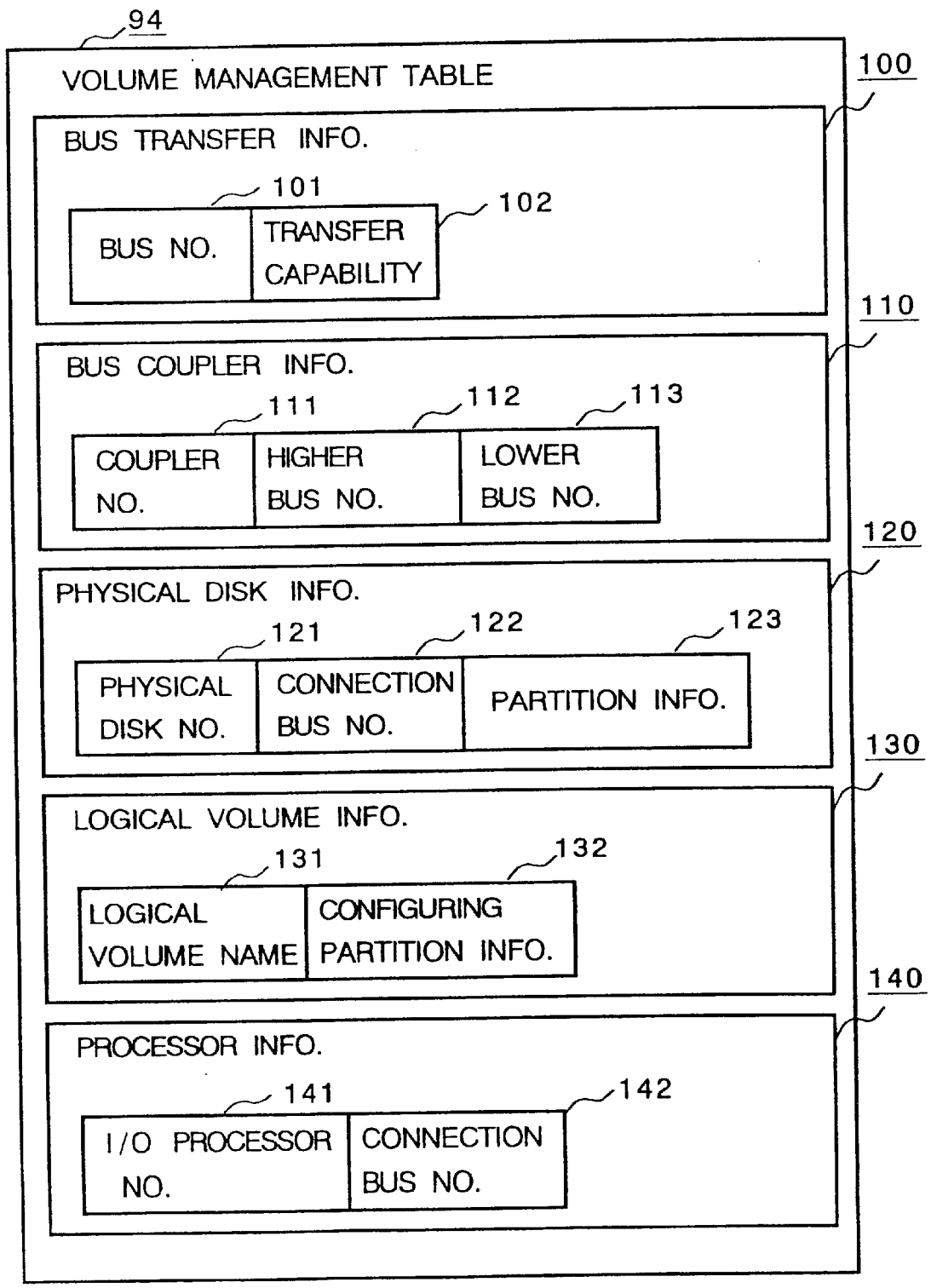
FIG. 3 shows internal configuration of a volume management table of Embodiment 1 of the present invention.

FIG. 3 shows an internal configuration of the volume management table 94 of FIG. 2.

The volume management table 94 is mainly made up of bus transfer information 100, bus coupler information 110, physical disk information 120, logical volume information 130, and I/O processor information 140. The bus transfer information 100 mainly stores a bus number 101 and bus transfer capability 102. The transfer capability is the transfer efficiency including the capability of peer-to-peer data transfer. The simplest form of the transfer capability is to store capability/incapability of peer-to-peer data transfer as ON/OFF. Or, if the transfer efficiency is expressed in five steps, values 1 through 5 are stored. For example, 1 indicates the maximum transfer efficiency, thus the transfer efficiency is indicated in the order of 1>2>3>4>5. 5 indicates transfer incapability. In the bus transfer information 100, a set of the bus number 101 and the bus transfer capability 102 is stored in a number equal to the number of buses. In the bus coupler information 110, mainly, a bus coupler device number 111, a connected higher bus number 112, and a lower bus number 113 are stored. Sets of these numbers are stored in a number equal to the number of bus couplers. In the physical disk information 120, mainly, a physical disk number 121, a connected connection bus number 122, and partition information 123 on the physical disks are stored. Sets of these numbers and information are stored in a number equal to the number of physical disks. The partition information stores the partition numbers identified by the operating system and partition offset, and so on. In the logical volume information 130, mainly, a logical volume name 131, and partition information 132 of the physical disks constituting the logical volume are stored. Sets of these numbers and information are stored in a number equal to the number of logical volumes. In the I/O processor information 140, mainly, the I/O processor number 141 and the connection bus number 142 are stored. Sets of these numbers are stored in a number equal to the number of I/O processors.

Figure 4:
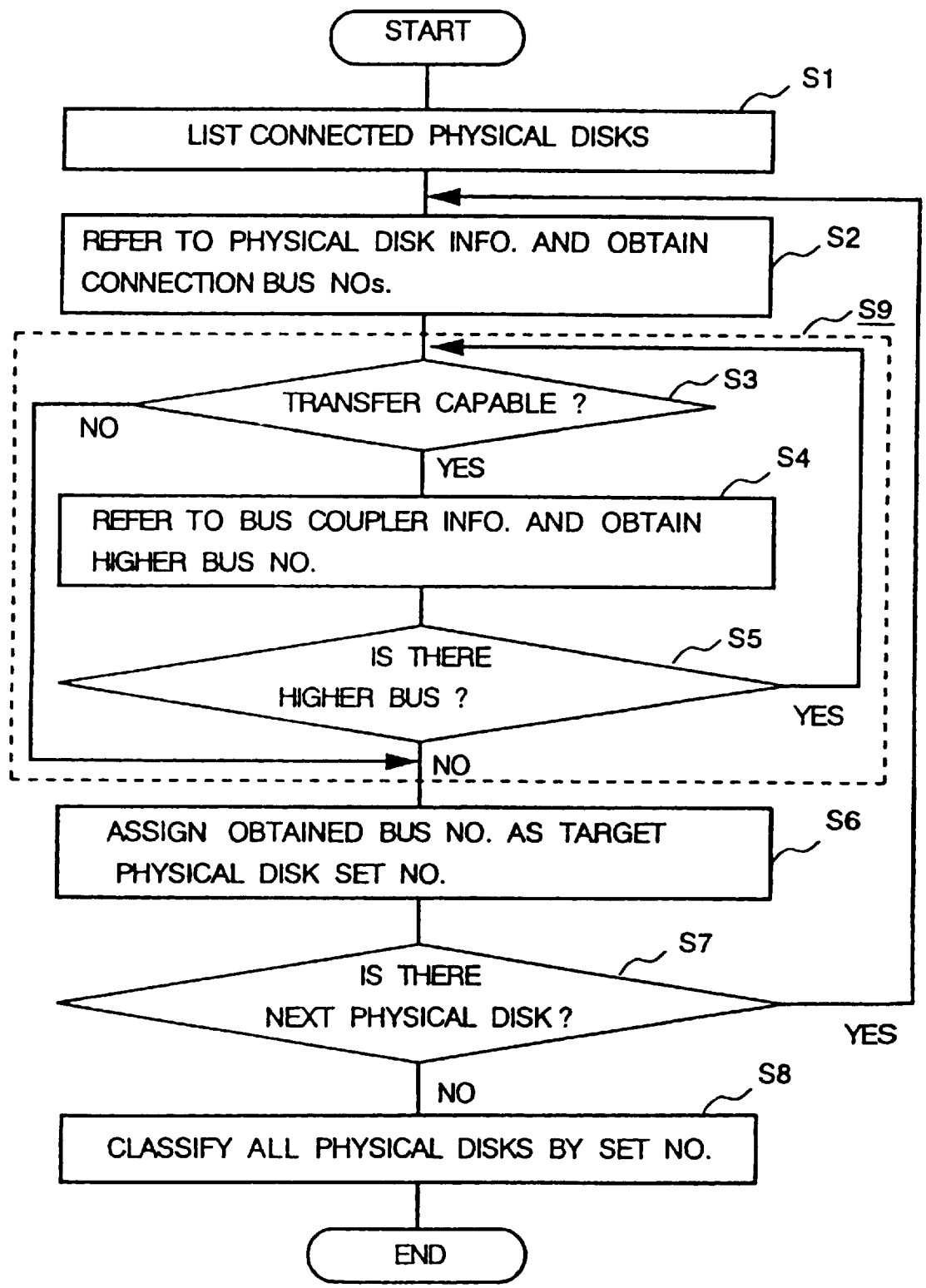
FIG. 4 shows a flow classifying physical disks showing Embodiment 1 of the present invention.

FIG. 4 shows a flowchart showing the procedure by which the volume management module gets the combination of physical disks capable of data transfer.

First, the volume management module 92 refers to physical disk information 120 of volume management table 94, and lists connected physical disks in order (step S1), and obtains connection bus number 122 (step S2) of physical disk information 120 of the target physical disk. By referring to transfer capability 102 of bus transfer information 100, whether or not the target bus is capable of transfer is checked (step S3). If the bus is proven to be incapable of transfer, the procedure goes forward to step S6. When the bus is capable of transfer, the higher bus number 112 is obtained from low bus number 113 of bus coupler information 110 (step S4). When there is a higher bus number, (step S5), the procedure goes back to step S3 with the higher bus number as the bus number of the target physical disk. Step S9, from step S3 through step S5, is the step for obtaining the number of the higher bus capable of transfer via the bus coupler. After the loop from step S3 to step S5 is finished, the last bus number is regarded as the set number of the target physical disk (step S6). When there is a next physical disk, the procedure returns to step S2 (step S7). After the set numbers are obtained for all physical disks, the physical disks are classified (step S8) according to the set numbers (bus numbers).

The combination of physical disks capable of data transfer is obtained by the set number (bus number), according to the procedure of the above step S1 through step S8. The physical disks included in the combination of physical disks show that they are mutually capable of data transfer. Conversely, the physical disks included in the combination of physical disks are incapable of data transfer to the physical disks not included in the combination of the physical disks.

Figure 5:
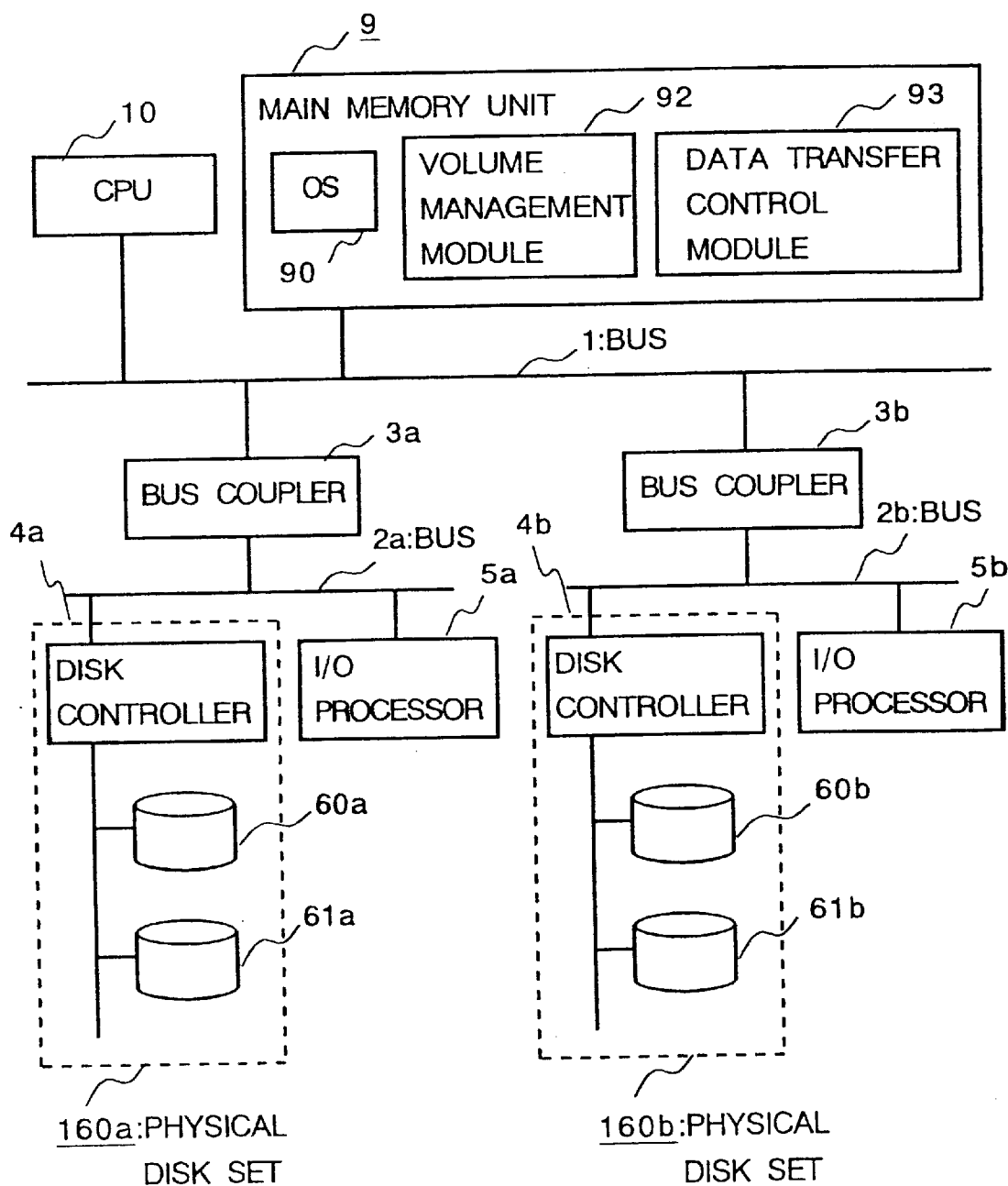
FIG. 5 the configuration of classified physical disks of Embodiment 1 of the present invention.

When bus 1 in FIG. 1 is a path incapable of peer-to-peer transfer, and bus 2a and bus 2b are paths capable of peer-to-peer transfer, the combination of physical disks obtained according to the procedure of FIG. 4 is shown in FIG. 5.

The physical disk set 160a is constructed with only physical disk 60a and physical disk 60b connected to bus 2a. The physical disk set 160b is constructed with only physical disks 60b and 61b connected to bus 2b. Transfer efficiency is often boosted when a bus coupler is not involved in the transfer path of data transfer. In such a case, step 9 from step S3 to step S5 of FIG. 4 is skipped. As step S9 is not implemented, the connection bus number 122 of physical disk information 120 becomes the set number of the physical disk. For the combination of physical disks capable of transferring data generated when step S9 is not executed, the physical disks included in the combination of the physical disks can mutually transfer data, but data transfer is not guaranteed for the physical disks not included in the combination of the physical disks (may be transferred, may not be transferred).

In creating a logical volume, the user can refer to the combination of the physical disks obtained according to the above procedure. Or the volume management module 92 can automatically create a logical volume constructed by physical disks included in the combination of obtained physical disks. Furthermore, if the user creates a logical volume with a combination of unfavorable physical disks, the volume management module 92 can issue a warning to draw the user's attention.

Figure 6:
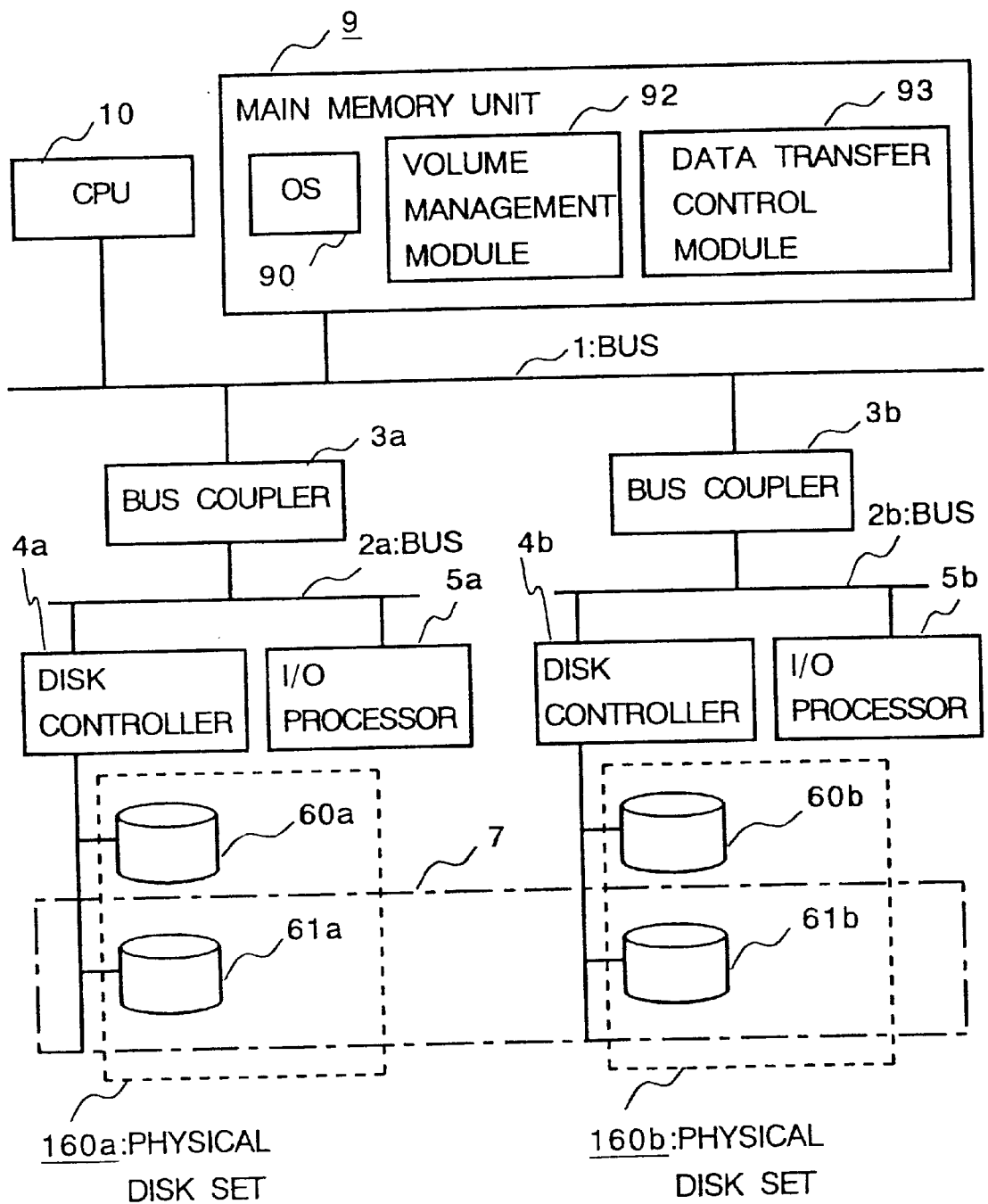
FIG. 6 shows the configuration of an undesirable logical volume of Embodiment 1 of the present invention.

In FIG. 6, like FIG. 5, when bus 1 is incapable of transfer, and buses 2a and 2b are paths capable of peer-to-peer transfer, for instance, when the user tries to create logical volume 7, the volume management module 92 can issue a warning.

In this way, the creation of logical volume 7 can be prohibited.

Figure 7:
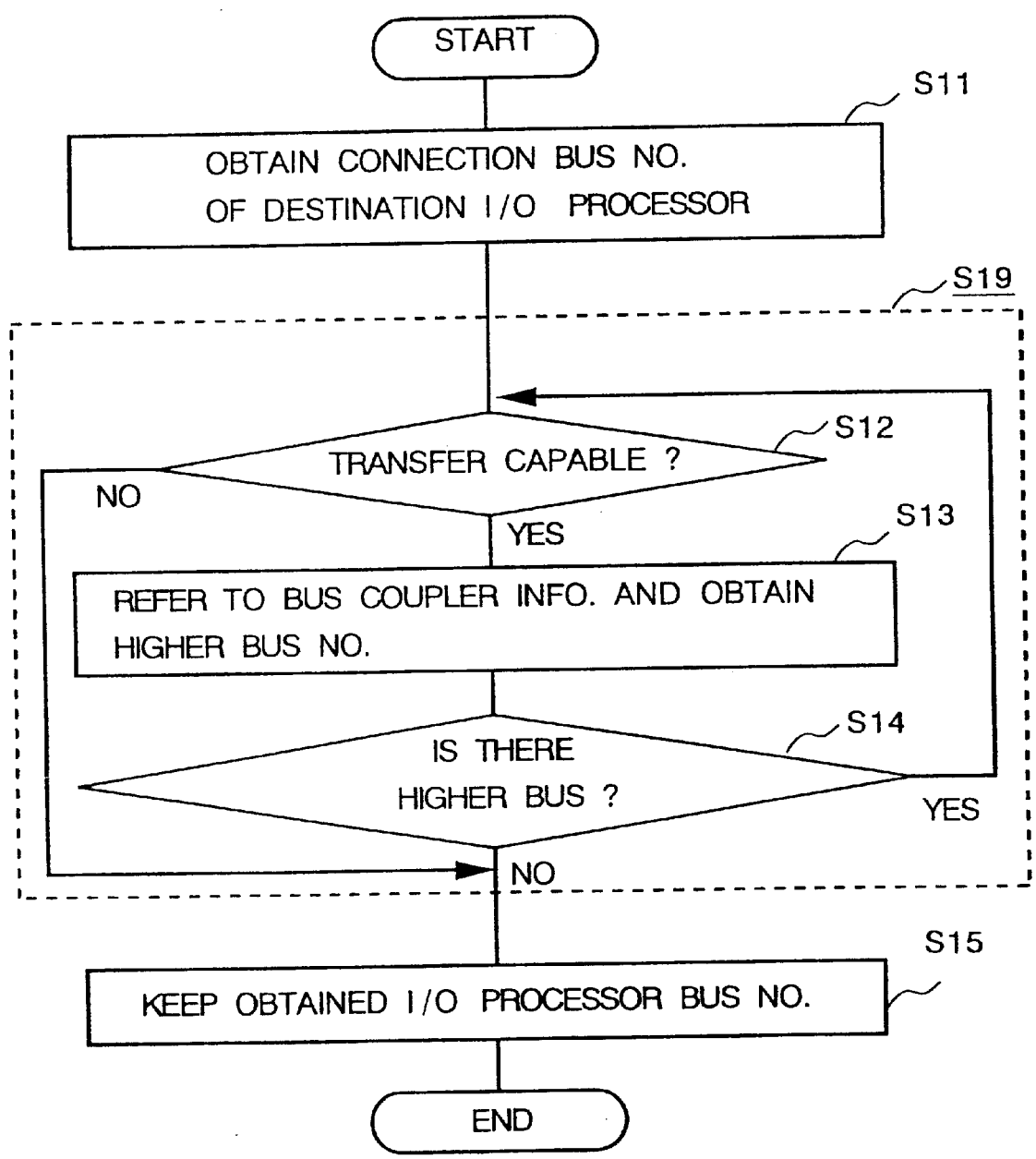
FIG. 7 shows a flow obtaining a higher bus number of the I/O processor of Embodiment 1 of the present invention.
Figure 8:
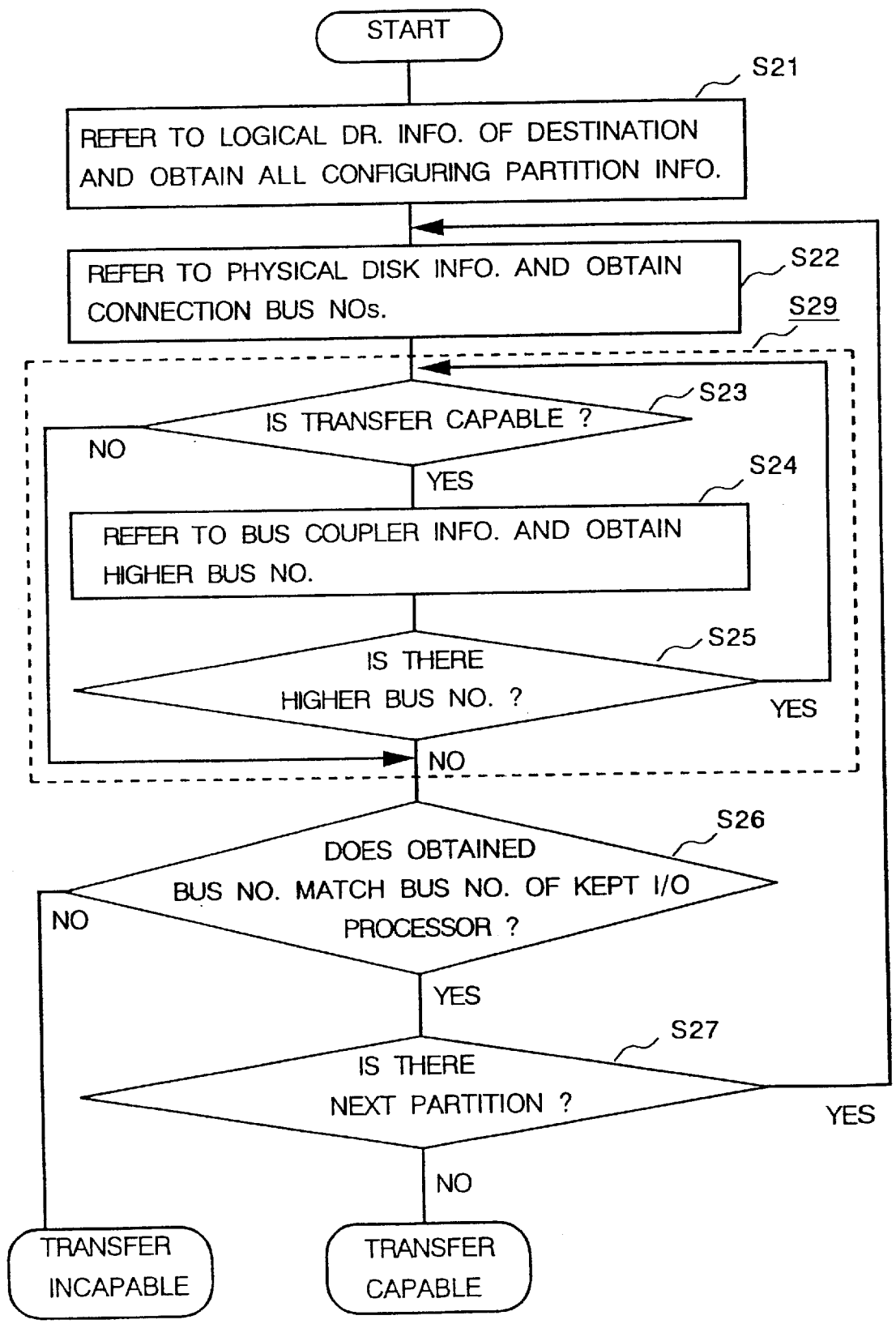
FIG. 8 shows a flow identifying the capability of transfer between the logical volume and I/O processor of Embodiment 1 of the present invention.

FIGS. 7 and 8 are the flowcharts showing how the data transfer control module identifies the transfer capability of the transfer paths at the time of data transfer according to this embodiment.

In FIG. 7, the data transfer control module 93 refers to I/O processor information 140 via volume management module 92 and obtains connection bus number 142 corresponding to the number of the destination I/O processor (step S11). By referring to transfer capability 102 of bus transfer information 100, whether the target bus is capable of transfer is checked (step S12). When the bus is peer-to-peer transfer incapable, the procedure advances to step S15. The higher bus number 112 is obtained (step S13) from low bus number 113 of bus coupler information 110. When the higher bus number is existent, the procedure returns to step S12 (step S13) with the higher bus number as the target bus number. The step S19 from step S12 to step S14 is the step for obtaining the number of the higher bus capable of transfer via the bus coupler. After the loop from step S12 to step S14 is finished, the last bus number is stored as the highest number of the target I/O processor (step S15).

In FIG. 8, the partition information 132 configuring the logical volume is listed referring to logical volume information 130 of volume management table 94 (step S21). The connection bus number 122 corresponding to partition information 123 of physical disk information 120 is obtained (step S22). Referring to transfer capability 102 of bus transfer information 100, the target bus is checked to determine whether transfer is capable or not (step S23). When the bus is incapable of peer-to-peer transfer, the procedure proceeds to step S26. When the bus is capable of peer-to-peer transfer, a higher bus number 112 is obtained (step S24) from the lower bus number 113 of bus coupler information 110. When there is a higher bus number, the procedure returns to step S23 with the higher bus number as the target bus number. The step S29 from step S23 through step S25 is the step for obtaining the number of a higher bus capable of transferring via the bus coupler. After the loop from step S23 to step S25 is finished, the last bus number is the highest bus number of the target partition, and is compared to the highest bus number (step S26) of the I/O processor kept at step S15 of FIG. 7. If the highest bus numbers do not agree, data transfer is incapable between the target logical volume and the I/O processor. When the highest bus numbers agree, and if there is a next partition, then the procedure returns to step S22 (step S27). When the highest bus numbers agree with the highest bus numbers of the I/O processors for all partition information, peer-to-peer transfer is allowed between the target logical volume and the I/O processor.

There are times when transfer efficiency is boosted when the bus coupler is not involved in the data transfer path. In that case, step S19 from step S12 through step S14 of FIG. 7, and step S29 from step S23 through step S25 of FIG. 8 can be skipped. In the loops of step S19 and step S29, by obtaining the total number of the bus couplers by memorizing the number of loops in volume management table 94, for example, the number of loops can be used for weighing the transfer capability 102 of bus transfer information 100 of volume management table 94. It is therefore judged that the larger of the number of total bus couplers, the lower the transfer efficiency.

There are times when transfer efficiency is boosted when transfer in the direction of low bus is not conducted via the bus coupler on the data transfer path.

Figure 9:
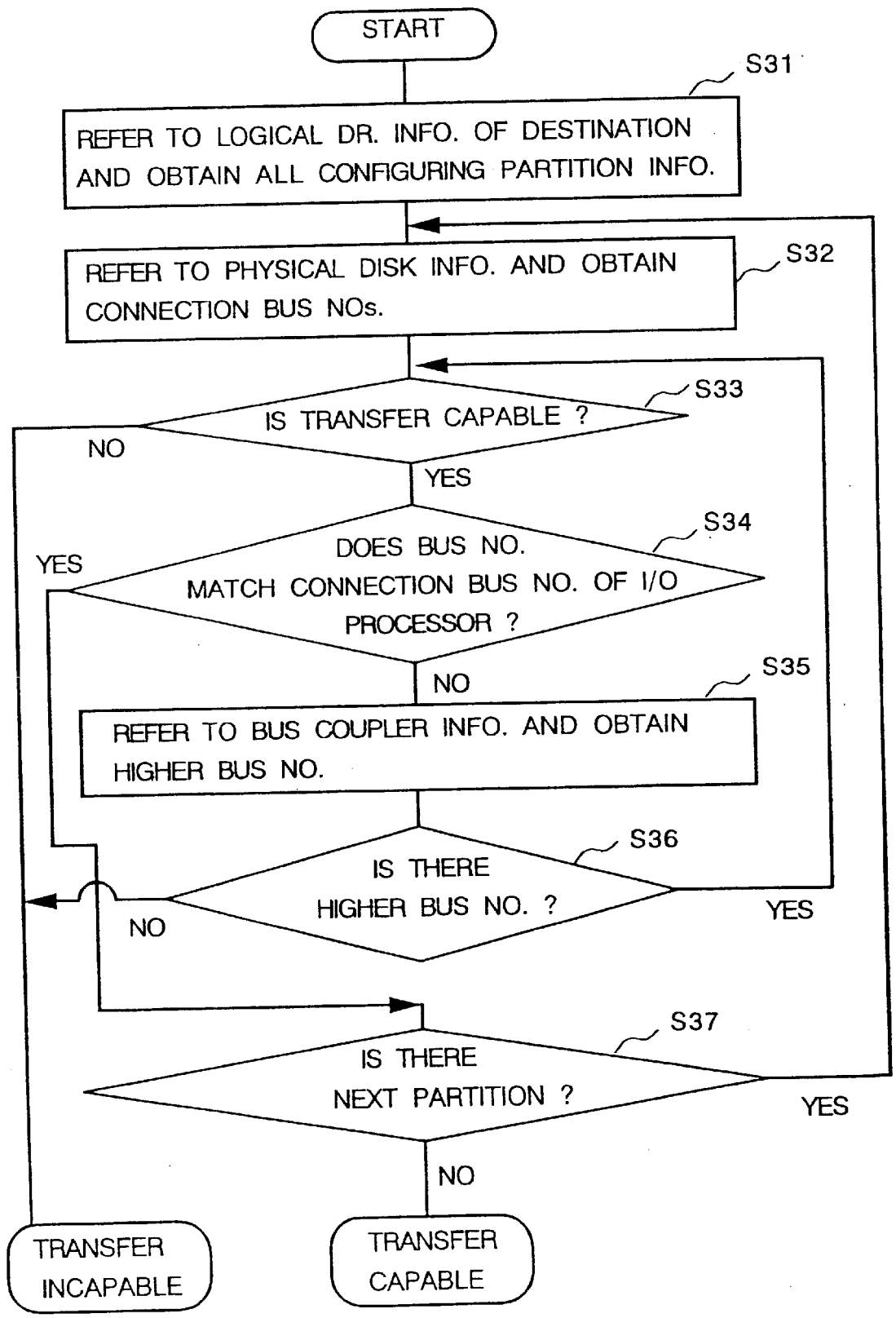
FIG. 9 shows the flow identifying the capability of transfer between the logical volume and the I/O processor of Embodiment 1 of the present invention.

FIG. 9 is the flowchart showing the procedure of obtaining the transfer capability when data transfer to any low bus is prohibited.

When data transfer to a low bus is prohibited, the procedure shown in FIG. 7 needs not be implemented because no higher bus is used. That is, there is no need for obtaining the highest bus number of the I/O processor.

In FIG. 9, the partition information 132 configuring the logical volume is listed (step S31) by referring to logical volume information 130 of volume management table 94. Then, the connection bus number 122 corresponding to the partition information 123 of physical disk information 120 is obtained (step S32). By referring to transfer capability 102 of bus transfer information 100, the target bus is checked to determine whether transfer is capable or not (step S33). When the bus is incapable of peer-to-peer transfer, transfer is not capable between the target logical volume and the I/O processor. When the bus is capable of transfer, the bus number is compared to connection bus number 142 of the I/O processor (step S34). When the bus numbers do not agree the higher bus number 112 is obtained from the low bus number 113 of bus coupler information 110 (step S35). When there is a higher bus number, the procedure returns to step S33 with the higher bus number as the target bus number. When there is no higher bus number, transfer is not capable between the target logical volume and the I/O processor. When the bus number and connection bus number 142 of the I/O processor agree, and if there is a next partition, the procedure returns to step S32 (step S37). When the bus numbers matching the connection bus numbers of the I/O processor exist in any of the bus layers for all partition information, peer-to-peer transfer is capable between the target logical volume and the I/O processor.

Figure 10:
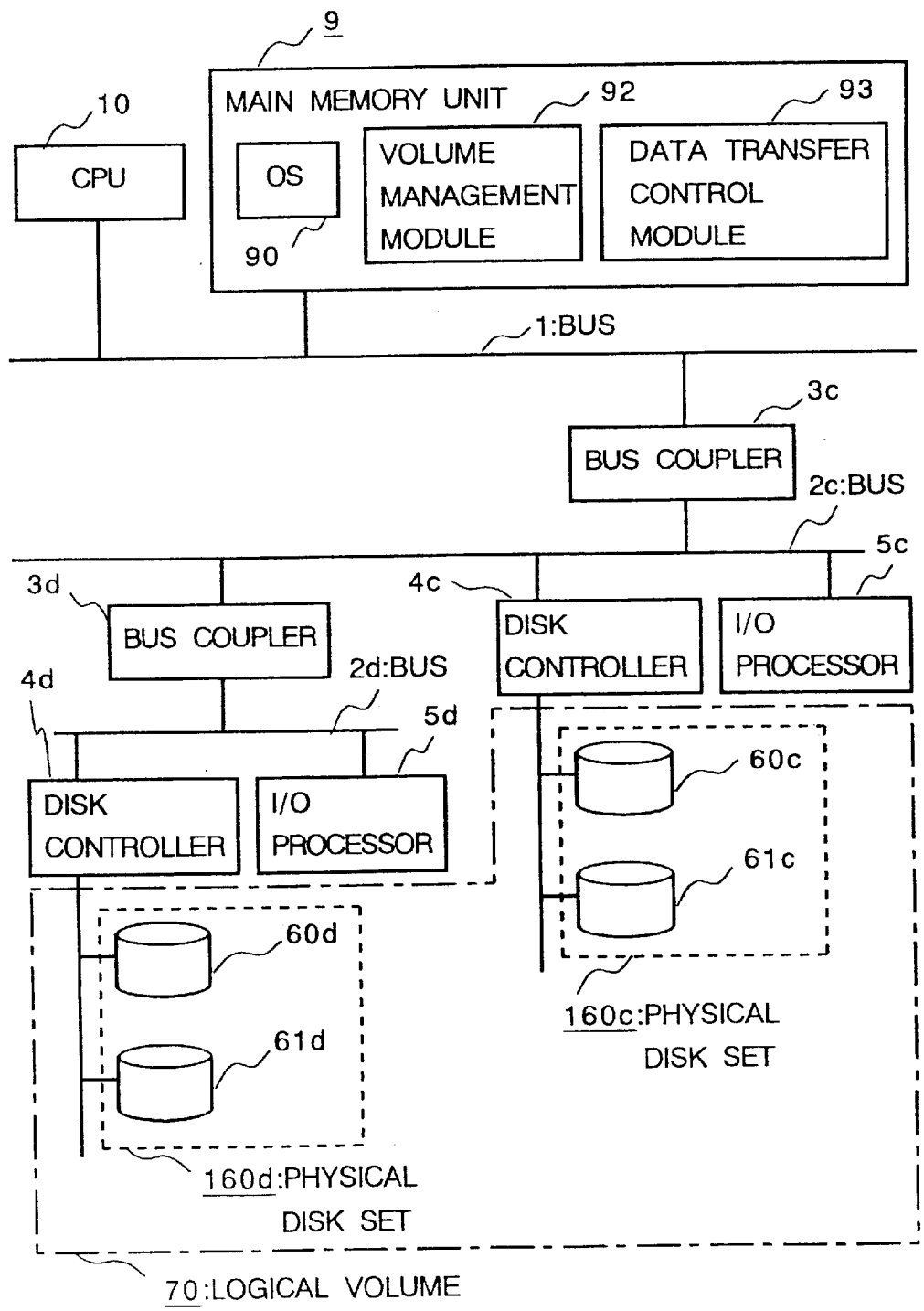
FIG. 10 shows the configuration of the classified physical disks of Embodiment 1 of the present invention.

FIG. 10 shows an example of obtaining the transfer capability in accordance with the procedure of FIG. 9.

In FIG. 10, buses 2c and 2d are capable of peer-to-peer transfer. If transfer to a lower bus is prohibited via the bus couplers on the data transfer paths, transfer is capable between physical disk set 160d and I/O processor 5c of FIG. 10. Peer-to-peer transfer is capable between physical disk set 160c and I/O processor 5c via bus 2c. Transfer is not capable between physical disk set 160c and I/O processor 5d because bus 2d of I/0 processor 5d does not agree either with bus 2c of physical disk set 160c or higher bus 1. As the result, the logical volume 70 configured by physical disk set 160c and 160d can carry out peer-to-peer transfer only between I/O processor 5c, according to the procedure of FIG. 9.

Following the above procedures (FIG. 7, FIG. 8, and FIG. 9), the data transfer control module 93 can search an I/O processor capable of peer-to-peer transfer from the logical volume storing data. When there is no I/O processor capable of data transfer, the data transfer control module 93 can issue a warning to the user or forward the data to the main memory unit to be processed by the Central Processing Unit (CPU).

The explanation of this embodiment is set forth with the physical disk as an example of storage devices configuring the logical volume. Other storage media such as magnetic tapes or semi-conductor disks will also do. It is also possible to apply a remote drive via the network.

Although Embodiment 1 is explained mainly focusing on the capability/incapability of peer-to-peer transfer, the data transfer control module 93 can apply to transfer efficiency instead of the capability/incapability of peer-to-peer transfer. Warning can be issued depending on transfer efficiency, or data can be forwarded to the main memory unit to be processed by the CPU.

Embodiment 2.

The user knows a file that contains the data to be transferred. The logical volume containing the file is also known to the user. The system manager knows logical disks that constitute the logical volume. However, the user cannot tell the physical disks containing the file because it is usually hidden in the operating system. The data transfer control module in Embodiment 1 is realized depending on the information of the physical disks configuring the logical volume by inquiring of the operating system or directly referring to the table created by the operating system. A more precise data transfer control module can be achieved if the physical disks containing the file and its data blocks to be transferred are known.

The term file in this embodiment refers to a numerical sequence stored in the storage device to be transferred, and the term data block refers to a block of numerical sequence which is a unit of data transfer. A file is made up of two or more data blocks.

Embodiment 2 enlarges upon the structure of operating system 90 in which volume management module 92 and data transfer control module 93 are incorporated for the purpose of identifying the arrangement of files and data blocks on a physical disk. By incorporating volume management module 92 and data transfer control module 93 into operating system 90, the volume management module 92 can obtain information regarding a physical disk on which the file and the data blocks hidden in the operating system exist. Being incorporated into the operating system, the volume management table created by volume management module 92 is the same as volume management table 94 shown in FIG. 3. The procedure by which data transfer control module 93 identifies the transfer capability or incapability between the physical disk and the I/O processor is the same as that of FIG. 7 and FIG. 8. However, step S21 and step S27 in FIG. 8 are omitted. When an operating system reads/writes a file, the data transfer control module 93 identifies a physical disk on which the file exists, and, based on the number of the physical disk, identifies the physical disk information 120 to be referred at step S22 in FIG. 8.

Then, as described in Embodiment 1, connection bus number 122 corresponding to partition information 123 of physical disk information 120 is obtained (step S22). Then the transfer capability 102 of bus transfer information 100 is consulted to check whether the target bus is available for transfer (step S23). When the bus is incapable of peer-to-peer transfer, the process proceeds to step S26. From low bus number 113 of bus coupler information 110, higher bus number 112 is obtained (step S24). When there is a higher bus number, the procedure returns to step S23 with the higher bus number as the target bus number. After the loop from step S23 to step S25 is finished, the last bus number is assigned to be the highest bus number of the target partition, and compared to the highest bus number (step S26) of the I/O processor stored at step S15 in FIG. 7. If the highest bus numbers do not agree, data cannot be transferred between the target logical volume and I/O processor. When the highest bus numbers agree, then peer-to-peer transfer is capable between the target logical volume and I/O processor.

If transfer efficiency is better when the bus coupler is not transferred in the direction of the low bus on a transfer path of data transfer, step S31 and step S37 of FIG. 9 are omitted. When the operating system reads/writes a file, the data transfer control module 93 identifies a physical disk on which the target file exists, and based on the physical disk number, the physical disk information 120 to be consulted at step S32 in FIG. 9 is identified.

Then, as described in Embodiment 1, the connection bus number 122 corresponding to partition information 123 of physical disk information 120 is obtained (step S32). The transfer capability of bus transfer information 100 is checked to determine whether the target bus is capable of data transfer (step S33). When the bus is incapable of peer-to-peer transfer, transfer is incapable between the target logical volume and the I/O processor. The bus number is compared to connection bus number 142 of the I/O processor (step S34). If they do not agree a higher bus number 112 is obtained (step S35) from low bus number 113 of bus coupler information 110. When a higher bus number exists, the procedure returns to step S33 with the higher bus number as the target bus number. When there is no higher bus number, transfer is incapable between the target logical volume and the I/O processor. When the bus number and connection bus number 142 of the I/O processor agree, peer-to-peer transfer is capable between the target logical volume and the I/O processor.

Figure 11:
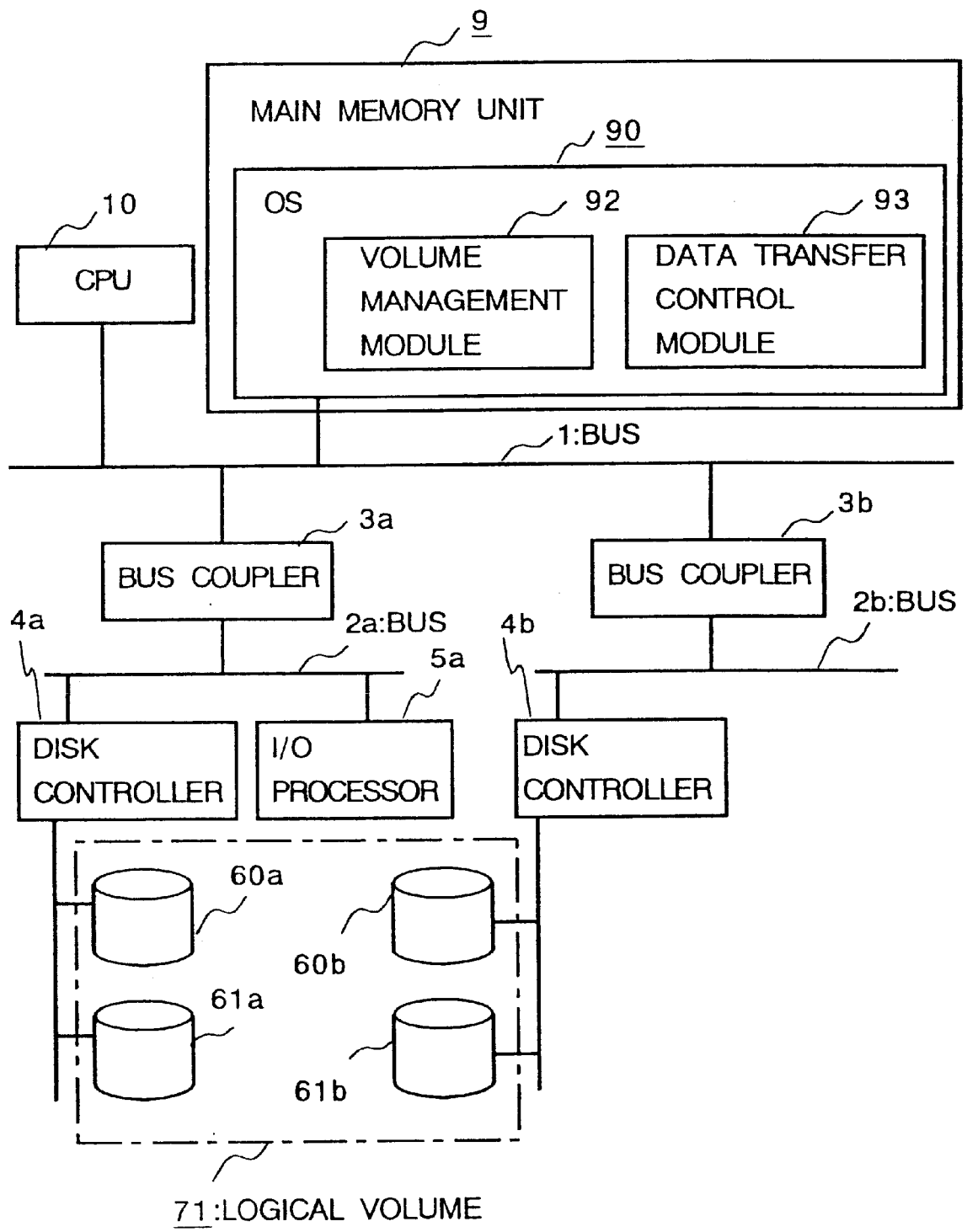
FIG. 11 shows a configuration of mirrored physical disks of Embodiment 2 of the present invention.

FIG. 11 shows the system configuration for this embodiment in which the volume management module and the data transfer control module are incorporated as part of the operating system.

Being incorporated into operating system 90, the data transfer control module 93 can identify a physical disk on which the file and data blocks to be transferred exist. The bus 1 is not capable of peer-to-peer data transfer, and buses 2a and 2b are capable of peer-to-peer data transfer. The I/O processor to which data is transferred is not connected to bus 2b. The logical volume 71 is a mirror disk constituted by physical disks 60a, 61a, 60b, and 61b, and the contents stored in physical disk 60a and physical disk 60b are exactly the same. Also, the contents stored on the physical disk 61a and physical disk 61b are exactly the same.

Under the above-mentioned hardware configuration, the data transfer control module 93 can select an I/O processor based on the transfer capability either one of physical disks 60a, 61a, or physical disks 60b, 61b.

In FIG. 11, in order to directly transfer data stored in logical volume 71 between devices, the data to be transferred is first identified as to which physical disk it exists on by the operating system. And if it is evident that physical disks 60a, 61a are the target of data transfer while the data stored on physical disks 60b and 61b, the mirror data, are not the target of data transfer, then the data can be transferred between logical volume 71 and I/O processor 5a. If the data stored on physical disks 60b and 61b are the target of transfer, because the bus 1 is incapable of peer-to-peer data transfer, data transfer between logical volume 71 and I/O processor 5a is impossible.

In a logical volume configuration under which a file that contains data to be transferred is spread over two or more physical disks, the data transfer control module can check the physical disks in which each data block of the file exists and select a transfer path having better transfer efficiency for data transfer.

Figure 12:
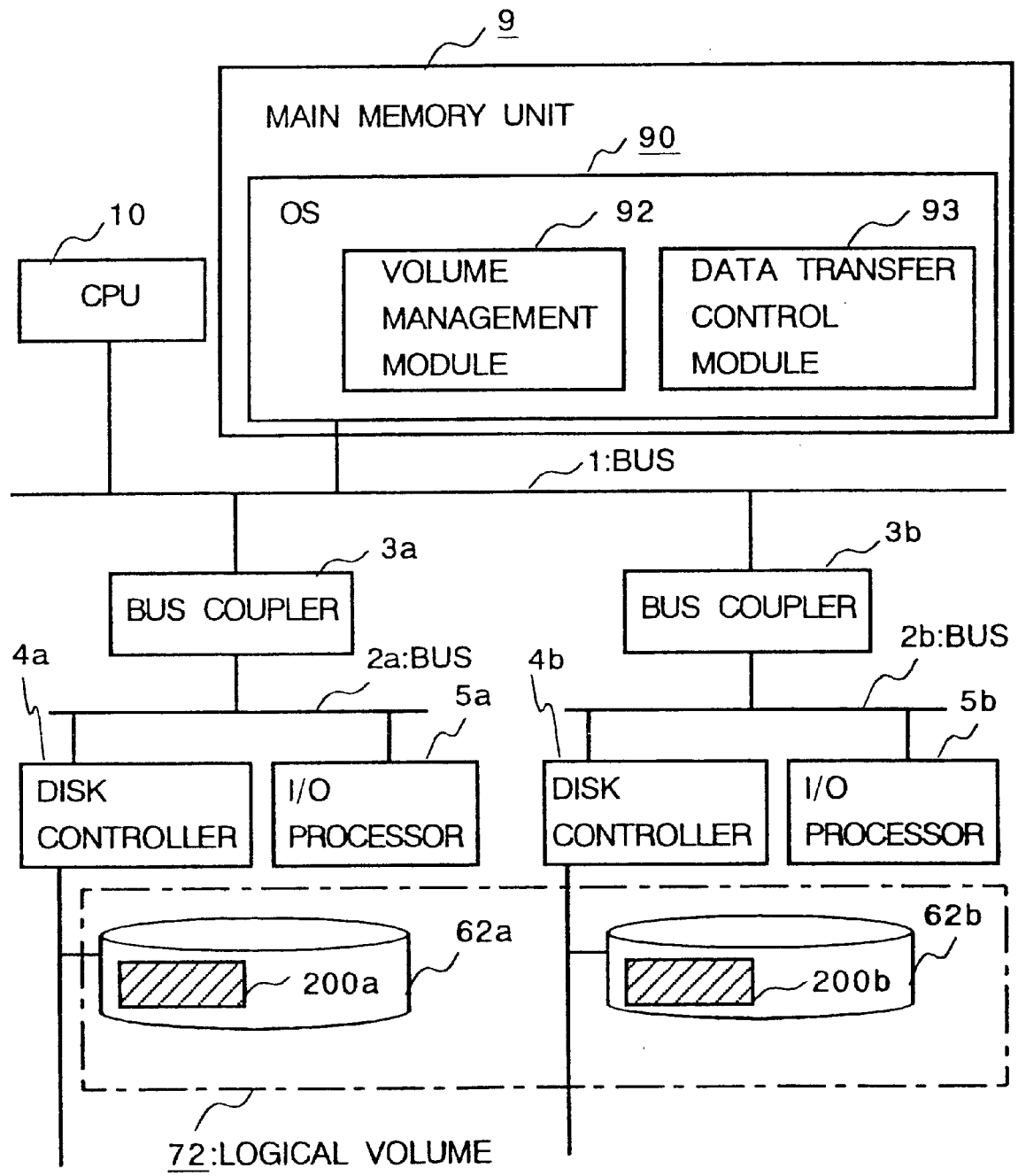
FIG. 12 shows the configuration of a data block for Embodiment 2 of the present invention.
Figure 13:
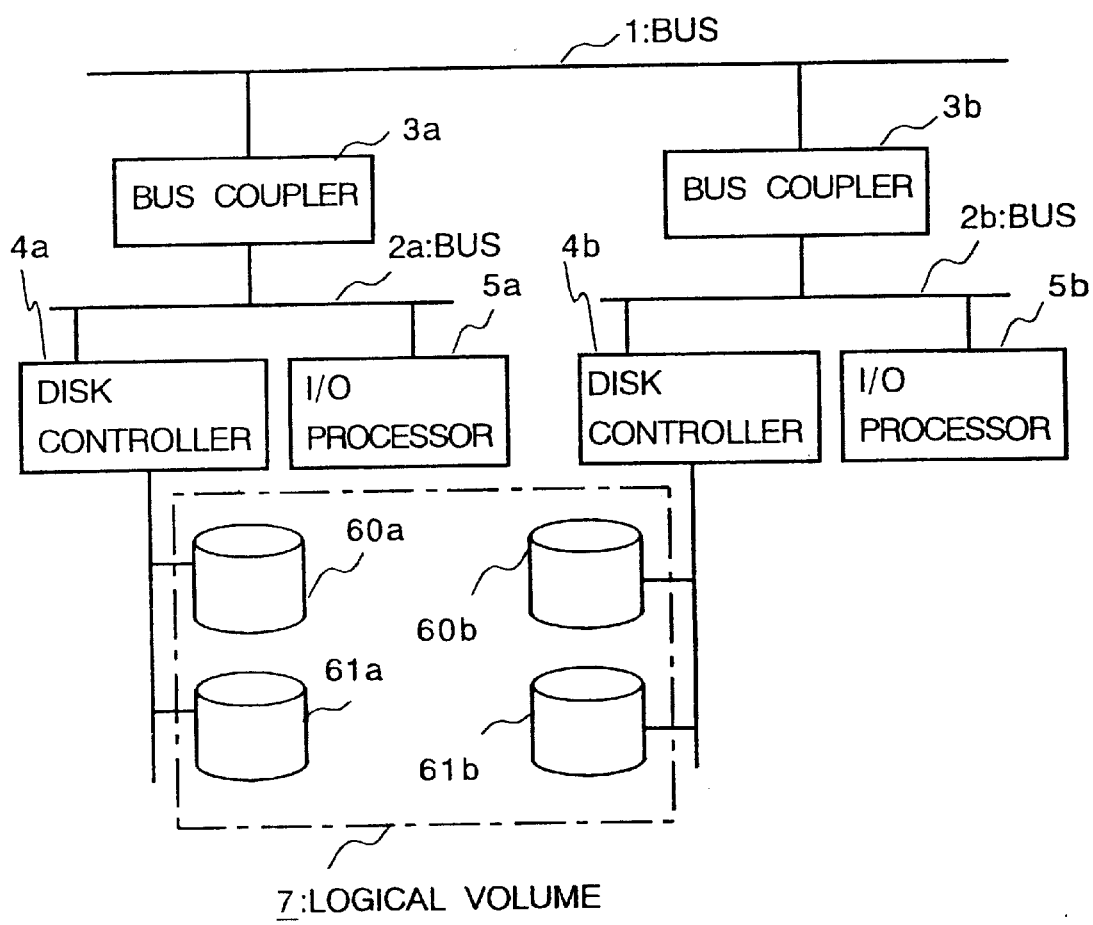
FIG. 13 shows an example of the conventional peer-to-peer data transfer.

In FIG. 12, the transfer path that passes through bus 1 is assumed to be a path with low data transfer efficiency, and transfer paths that pass through only bus 2a and bus 2b are considered to have good data transfer efficiency. The logical volume 72 is configured by physical disk 61a connected to disk controller 4a connected to bus 2a and physical disk 61b connected to disk controller 4b connected to bus 2b.

When transferring data in a file stored in logical volume 72, the operating system identifies that data block 200a to be read upon transfer exists on physical disk 62a, and data transfer control module 93 can switch the destination to I/O processor 5a. When the operating system identifies that data block 200b exists on physical disk 61b, the data transfer control module 93 can switch the destination to I/O processor 5b. In this way, the I/O processor can be dynamically switched over depending on the physical disk on which the data block of the target file to be transferred exists so that the optimum transfer path will be taken.

In Embodiments 1 and 2, the CPU, the main memory unit, a plurality of storage devices for memorizing data, and a plurality of data processing devices are connected, and the data transfer apparatus between devices which can mutually transfer data between the storage devices and the data processing devices without passing through the CPU or the main memory unit is explained. The volume management module identifies the physical positions of the storage devices and the physical position of the data processing devices. The volume management module identifies a single or plural sets of storage devices with better data transfer efficiency from the physical positions of the plurality of storage devices, physical positions of the data processing devices and the data transfer efficiency which includes the data transfer capability/incapability. Moreover, the data transfer control module weighs the data transfer including the data transfer capability/incapability based on the physical positions of the single or plural storage devices that configure the logical volume, the physical positions of the data processing devices, and data transfer efficiency of the transfer paths.

In addition, the volume management module automatically creates a logical volume which does not include a transfer path of incapable data transfer, or a transfer path with poor transfer efficiency for data transfer.

The volume management module issues a warning against the creation of a logical volume having a transfer path incapable of data transfer, or a transfer path with poor transfer efficiency for data transfer.

This volume management module can tell which combination of storage devices enables or disables data transfer, and transfer efficiency/inefficiency at the time of creating a logical volume, and therefore the logical volume can automatically be created by combining devices which do not have paths incapable of data transfer or poor transfer efficiency, whenever necessary. It also issues a warning to the user against the creation of a logical volume in combination of storage devices having a path incapable of transfer or poor transfer efficiency.

This embodiment offers the data transfer control module that restricts data transfer in tandem with the volume management module.

The data transfer control module of this embodiment issues a warning to the data transfer apparatus between devices against the selection of a transfer path incapable of transfer or a transfer path with poor transfer efficiency at the time of data transfer.

When the data transfer apparatus between devices selects a transfer path incapable of transfer or a transfer path with poor transfer efficiency, the data transfer control module does not perform data transfer between devices but transfers data to the main memory unit.

The data transfer control module selects the data processing device including a transfer path with better transfer efficiency based on the physical positions of the plurality of storage devices constituting the logical volume, the positions of storage devices containing the data blocks which are the target of data transfer, the physical positions of plurality of data processing devices, and transfer efficiency of the plurality of transfer paths, at data transfer.

The data transfer control module can prevent data from running through a path incapable of transfer, and obviates a fatal failure at data transfer. It can prevent data from running through a path with poor transfer efficiency, and prevents the performance degradation of the entire data transfer apparatus. Furthermore, data can be transferred to the main memory unit so that the data will be processed by the CPU without transferring data between devices when the path is incapable of data transfer or transfer efficiency is bad.

The volume management module and the data transfer control module can be achieved with a special hardware circuit, or with a programmed software. The programmed software can be incorporated into the operating system as a function of the operating system.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only, and not intended to be limiting. The invention is limited only as defined in the following claims and the equivalents thereto.

What is claimed is:

1. A data transfer apparatus for data transfer between devices including:

a central processing unit;

a main memory unit;

a primary bus to which the central processing unit and the main memory unit are connected for data transfer between the central processing unit and the main memory unit;

a plurality of secondary buses, at least some of the secondary buses being connected to the primary bus through bus couplers;

a plurality of storage devices and a plurality of data processing devices connected to respective secondary buses and communicating via a plurality of transfer paths including at least one of the secondary buses, so that data is transferred between the storage devices and the data processing devices via at least one of the plurality of transfer paths;

a table in the main memory for storing relative positions of the storage devices in the apparatus, relative positions of the plurality of data processing devices in the apparatus, and the data transfer efficiencies of the respective transfer paths;

a data transfer control module for identifying whether data transfer between the storage devices and the data processing devices only via secondary buses is possible, based on the relative positions of the plurality of storage devices in the apparatus, the relative positions of the plurality of data processing devices in the apparatus, and the data transfer efficiency of the plurality of transfer paths stored in the table; and a volume management module specifying a combination of storage devices to and from which the data can be transferred, based on the relative positions of the plurality of storage devices in the apparatus, the relative positions of the plurality of data processing devices in the apparatus, and the data transfer efficiencies of the respective transfer paths.

2. The data transfer apparatus of claim 1, wherein the data transfer control module issues a warning against selection of a transfer path including at least one secondary bus with poor transfer efficiency.

3. A data transfer apparatus for data transfer between devices including:

a central processing unit;

a main memory unit;

a primary bus to which the central processing unit and the main memory unit are connected for data transfer between the central processing unit and the main memory unit;

a plurality of secondary buses, at least some of the secondary buses being connected to the primary bus through bus couplers;

a plurality of storage devices and a plurality of data processing devices connected to respective secondary buses and communicating via a plurality of transfer paths including at least one of the secondary buses, so that data is transferred between the storage devices and the data processing devices via at least one of the plurality of transfer paths;

a table in the main memory for storing relative positions of the storage devices in the apparatus, relative positions of the plurality of data processing devices in the apparatus, and the data transfer efficiencies of the respective transfer paths; and a data transfer control module for identifying whether data transfer between the storage devices and the data processing devices only via secondary buses is possible, based on the relative positions of the plurality of storage devices in the apparatus, the relative positions of the plurality of data processing devices in the apparatus, and the data transfer efficiency of the plurality of transfer paths stored in the table, wherein the data transfer control module transfers data to the main memory unit without transferring the data between the storage and data processing devices if a transfer path including at least one secondary bus with poor transfer efficiency is selected.

4. A data transfer apparatus for data transfer between devices including:

a central processing unit;

a main memory unit;

a primary bus to which the central processing unit and the main memory unit are connected for data transfer between the central processing unit and the main memory unit;

a plurality of secondary buses, at least some of the secondary buses being connected to the primary bus through bus couplers;

a plurality of storage devices and a plurality of data processing devices connected to respective secondary buses and communicating via a plurality of transfer paths including at least one of the secondary buses, so that data is transferred between the storage devices and the data processing devices via at least one of the plurality of transfer paths;

a table in the main memory for storing relative positions of the storage devices in the apparatus, relative positions of the plurality of data processing devices in the apparatus, and, as the data transfer efficiencies of the respective transfer paths, data transfer capability/incapability; and a data transfer control module for identifying whether data transfer between the storage devices and the data processing devices only via secondary buses is possible, based on the relative positions of the plurality of storage devices in the apparatus, the relative positions of the plurality of data processing devices in the apparatus, and the data transfer efficiency of the plurality of transfer paths stored in the table, wherein the data transfer control module classifies the capability/incapability of data transfer based on the data transfer capability/incapability.

5. The data transfer apparatus of claim 1, wherein the volume management module automatically creates a logical volume from the combination of storage devices.

6. The data transfer apparatus of claim 1, wherein the volume management module prohibits creation of a logical volume including a storage device not included in the combination of the storage devices to and from which the data can be transferred.

7. The data transfer apparatus of claim 1, wherein the data transfer control module selects the data processing device using a transfer path including at least one secondary bus with high transfer efficiency, based on the relative positions of the plurality of storage devices in the apparatus and the relative positions of the plurality of data processing devices in the apparatus and having redundancy, and the transfer efficiencies of the respective transfer paths.

8. The data transfer apparatus of claim 1, wherein the data transfer control module identifies data transfer capability/incapability in file units.

9. The data transfer apparatus of claim 1, wherein the data transfer control module identifies data transfer capability/incapability in data block units.

10. The data transfer apparatus of claim 1, wherein the data transfer control module selects the data transfer device in unit files.

11. The data transfer apparatus of claim 1, wherein the data transfer control module selects the data transfer device in data block units.

12. A data transfer apparatus for data transfer between devices including:

a plurality of storage devices and a plurality of data processing devices connected via a plurality of transfer paths, so that data is transferred between the storage devices and the data processing devices via at least one of the plurality of transfer paths;

a table for storing relative positions of the storage devices in the apparatus, relative positions of the plurality of data processing devices in the apparatus, and the data transfer efficiencies of the respective transfer paths; and a volume management module for identifying a combination of storage devices capable of data transfer, based on the relative positions of the plurality of storage devices in the apparatus, the relative positions of the plurality of data processing devices in the apparatus, and the data transfer efficiencies of the respective transfer paths and wherein the volume management module automatically creates a logical volume from the combination of storage devices to and from which data can be transferred.

13. A data transfer apparatus for data transfer between devices including:

a plurality of storage devices and a plurality of data processing devices connected via a plurality of transfer paths, so that data is transferred between the storage devices and the data processing devices via at least one of the plurality of transfer paths;

a table for storing relative positions of the storage devices in the apparatus, relative positions of the plurality of data processing devices in the apparatus, and the data transfer efficiencies of the respective transfer paths; and a volume management module for identifying a combination of storage devices capable of data transfer, based on the relative positions of the plurality of storage devices in the apparatus, the relative positions of the plurality of data processing devices in the apparatus, and the data transfer efficiencies of the respective transfer paths, wherein the volume management module automatically creates a logical volume from the combination of storage devices to and from which data can be transferred, the volume management module prohibits creation of a logical volume including a storage device not included in the combination of the storage devices to and from which the data can be transferred.

14. The data transfer apparatus of claim 12, wherein the table stores data transfer capability/incapability as the data transfer efficiency, and wherein the volume management module identifies the combination of the storage devices to and from which the data can be transferred based on the capability/incapability of data transfer.

15. A method of data transfer between devices in an apparatus including a central processing unit, a main memory unit, a primary bus to which the central processing unit and the main memory unit are connected for communication between the central processing unit and the main memory unit, a plurality of secondary buses, at least some of the secondary buses being connected to the primary bus through bus couplers, and a plurality of storage devices and a plurality of data processing devices connected to respective secondary buses and communicating via a plurality of transfer paths including at least one of the secondary buses, and data is transferred between the storage devices and the data processing devices via at least one of the plurality of transfer paths, the method comprising:

storing relative positions of the storage devices in the apparatus, relative positions of the plurality of data processing devices in the apparatus, and data transfer efficiencies of the respective transfer paths;

controlling data transfer by identifying the capability/incapability of data transfer via secondary buses between the storage devices and the data processing devices, based on the stored relative positions of the plurality of storage devices in the apparatus, the relative positions of the plurality of data processing devices in the apparatus, and the data transfer efficiencies of the respective transfer paths; and managing a volume for identifying a combination of storage devices capable of data transfer via at least one of the secondary buses, based on the relative positions of the plurality of storage devices in the apparatus, the relative positions of the plurality of data processing devices in the apparatus, and the data transfer efficiencies of the respective transfer paths.

16. The data transfer apparatus of claim 13, wherein the table stores data transfer capability/incapability as the data transfer efficiency, and wherein the volume management module identifies the combination of the storage devices to and from which the data can be transferred based on the capability/incapability of data transfer.

* * * * *